US012020851B2

(12) United States Patent
Hirukawa

(10) Patent No.: US 12,020,851 B2
(45) Date of Patent: Jun. 25, 2024

(54) CIRCUIT

(71) Applicant: Murata Manufacturing Co., Ltd., Kyoto-fu (JP)

(72) Inventor: Atsuo Hirukawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 580 days.

(21) Appl. No.: 17/217,947

(22) Filed: Mar. 30, 2021

(65) Prior Publication Data

US 2021/0319946 A1 Oct. 14, 2021

(30) Foreign Application Priority Data

Apr. 8, 2020 (JP) ................................ 2020-069972

(51) Int. Cl.
*H01F 27/29* (2006.01)
*H01F 17/00* (2006.01)
*H01F 27/32* (2006.01)
*H01F 27/34* (2006.01)

(52) U.S. Cl.
CPC ....... *H01F 27/292* (2013.01); *H01F 17/0013* (2013.01); *H01F 27/324* (2013.01)

(58) Field of Classification Search
CPC ... H01F 27/292; H01F 17/0013; H01F 27/324
See application file for complete search history.

(56) References Cited

U.S. PATENT DOCUMENTS

2004/0179623 A1 9/2004 Huckeba
2013/0147574 A1* 6/2013 Wada ........................ H01P 1/36 333/24.2
2016/0359466 A1* 12/2016 Schmidhammer ... H03H 7/1775
2017/0222614 A1* 8/2017 Ellä et al. ............ H03H 7/0153
2018/0131330 A1* 5/2018 Itabashi .................... H03F 3/68
2019/0280079 A1* 9/2019 Bouvier ................ H01L 23/645

FOREIGN PATENT DOCUMENTS

CN 216054110 U 3/2022
JP H11-040920 A 2/1999
JP H1140920 A * 2/1999
JP 2004-281847 A 10/2004
JP 2004281847 A * 10/2004
JP 2010192974 A 9/2010
JP 2017005087 A 1/2017
JP 2018-078495 A 5/2018
JP 2019096819 A 6/2019
JP 2019-537268 A 12/2019
WO 2019064990 A1 4/2019

* cited by examiner

*Primary Examiner* — Malcolm Barnes
(74) *Attorney, Agent, or Firm* — Studebaker & Brackett PC

(57) ABSTRACT

A circuit includes a bias-tee circuit including a signal line, a constant-voltage power supply, an inductor, and a capacitor. The signal line includes a first signal line and a second signal line. The inductor includes a first inductor and a second inductor. The first inductor is connected to the first signal line and the constant-voltage power supply. The second inductor is connected to the second signal line and the constant-voltage power supply. The shortest distance between the first inductor and the second inductor is not less than 0.05 mm and not more than 1 mm (i.e., from 0.05 mm to 1 mm). The direction of a coil axis of the first inductor and the direction of a coil axis of the second inductor are parallel with a mounting surface and form an angle of approximately 90 degrees.

3 Claims, 3 Drawing Sheets

CIRCUIT

CROSS-REFERENCE TO RELATED APPLICATION

This application claims benefit of priority to Japanese Patent Application No. 2020-069972, filed Apr. 8, 2020, the entire content of which is incorporated herein by reference.

BACKGROUND

Technical Field

The present disclosure relates to a circuit.

Background Art

Circuits use various inductors. One example of such inductors is a multilayer coil component described in Japanese Unexamined Patent Application Publication No. 2019-96819. That multilayer coil component includes a multilayer body in which a plurality of insulating layers are laminated and a coil is incorporated and a first outer electrode and a second outer electrode electrically connected to the coil.

SUMMARY

The multilayer coil component in Japanese Unexamined Patent Application Publication No. 2019-96819 is described as being preferably used for, for example, a bias-tee circuit in an optical communication circuit because it has excellent high-frequency characteristics. In the multilayer coil component described in Japanese Unexamined Patent Application Publication No. 2019-96819, the insulating layers forming the multilayer body may be made of a magnetic material, such as a ferrite material. For the multilayer coil component including the insulating layers made of the magnetic material, it is considered that a magnetic flux is unlikely to leak to the outside of the multilayer body. If a plurality of multilayer coil components of that type are used in a circuit and some of them are close to each other, however, because the close multilayer coil components are likely to be magnetically coupled to each other, their magnetic fluxes may interfere with each other in a high-frequency band (e.g., a gigahertz band of not less than 20 GHz), and thus the high-frequency characteristics may degrade.

Accordingly, the present disclosure provides a circuit in which degradation in high-frequency characteristics is suppressed even when it includes a plurality of inductors close to each other.

According to preferred embodiments of the present disclosure, a circuit includes a bias-tee circuit including a signal line, a constant-voltage power supply, an inductor, and a capacitor. The signal line includes a first signal line and a second signal line. The inductor includes a first inductor and a second inductor. The first inductor is connected to the first signal line and the constant-voltage power supply. The second inductor is connected to the second signal line and the constant-voltage power supply. A shortest distance between the first inductor and the second inductor is not less than 0.05 mm and not more than 1 mm. A direction of a coil axis of the first inductor and a direction of a coil axis of the second inductor are parallel with a mounting surface and form an angle of approximately 90 degrees.

The present disclosure can provide the circuit in which the degradation in high-frequency characteristics is suppressed even when it includes the plurality of inductors close to each other.

Other features, elements, characteristics and advantages of the present disclosure will become more apparent from the following detailed description of preferred embodiments of the present disclosure with reference to the attached drawings.

DETAILED DESCRIPTION

A circuit according to the present disclosure is described below. The present disclosure is not limited to the configurations below and may be changed as needed within a range that does not depart from the scope of the present disclosure. The present disclosure also includes combinations of a plurality of preferred individual configurations described below.

Figure 1:
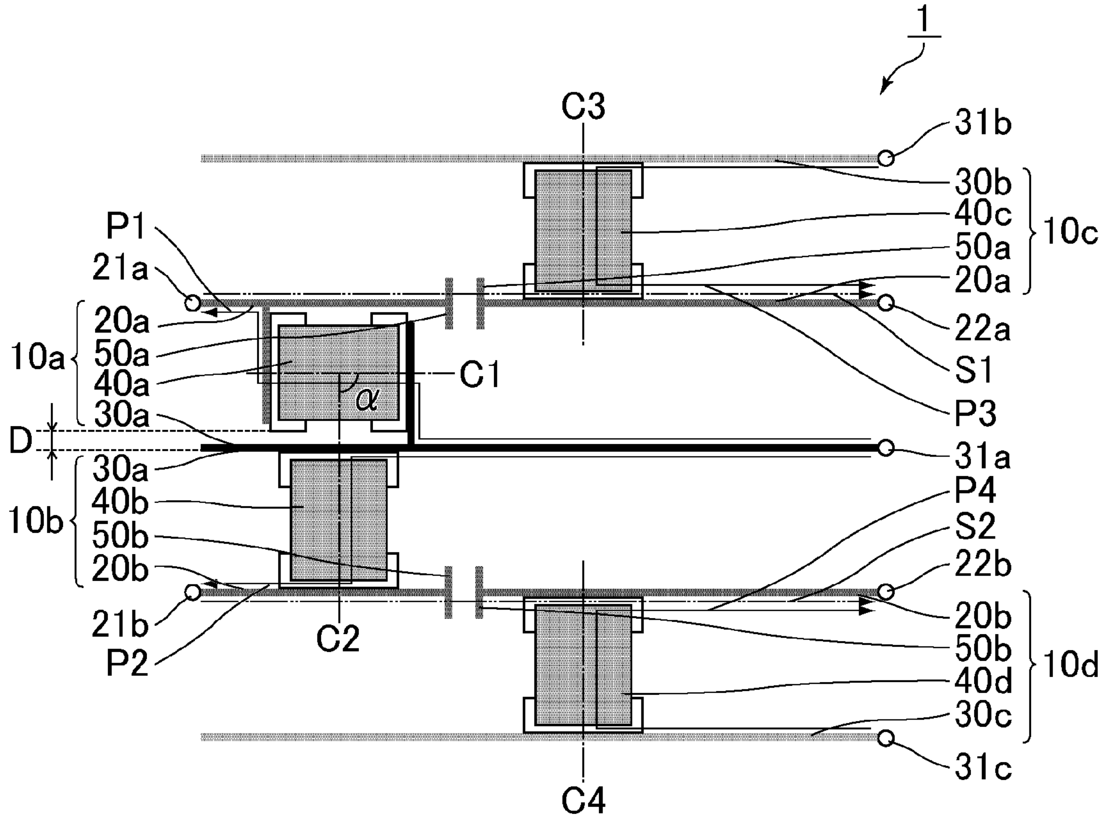
FIG. 1 is a plan diagram that illustrates an example circuit according to the present disclosure.

FIG. 1 is a plan diagram that illustrates an example circuit according to the present disclosure.

As illustrated in FIG. 1, a circuit 1 includes a first bias-tee circuit 10*a* and a second bias-tee circuit 10*b*.

The first bias-tee circuit 10*a* includes a first signal line 20*a*, a first power supply line 30*a*, a first inductor 40*a*, and a first capacitor 50*a*.

The first signal line 20*a* includes an input section 21*a* and an output section 22*a*. An input signal input into the input section 21*a* in the first signal line 20*a* is transmitted through a path S1 and output from the output section 22*a* in the first signal line 20*a* as a transmission signal (output signal).

The first power supply line 30*a* is connected to a first constant-voltage power supply 31*a*. That is, the first bias-tee circuit 10*a* also includes the first constant-voltage power supply 31*a*.

The first inductor 40*a* is connected to the first signal line 20*a* and the first power supply line 30*a*. Because the first power supply line 30*a* is connected to the first constant-voltage power supply 31*a*, the first inductor 40*a* is electrically connected to the first constant-voltage power supply 31*a* with the first power supply line 30*a* disposed therebetween. Because the first inductor 40*a* is disposed as described above, a power supply voltage of the first constant-voltage power supply 31*a* is applied to the input section 21*a* in the first signal line 20*a*, as illustrated in a path P1. When the input section 21*a* in the first signal line 20*a* is connected to, for example, a driver integrated circuit (IC), the power supply voltage of the first constant-voltage power supply 31*a* is applied to the driver IC. Because of the presence of the first inductor 40*a*, a signal transmitted through the first signal line 20*a* is not transmitted to the first power supply line 30*a*.

The first capacitor 50*a* is disposed between the output section 22*a* in the first signal line 20*a* and a connection section between the first signal line 20*a* and the first inductor 40*a*. Because the first capacitor 50*a* is disposed as described above, the power supply voltage of the first constant-voltage power supply 31*a* is not applied to the output section 22*a* in the first signal line 20*a* and is applied to the input section 21*a* in the first signal line 20*a* with stability.

The second bias-tee circuit 10*b* includes a second signal line 20*b*, the first power supply line 30*a*, a second inductor 40*b*, and a second capacitor 50*b*.

The second signal line 20*b* includes an input section 21*b* and an output section 22*b*. An input signal input into the input section 21*b* in the second signal line 20*b* is transmitted through a path S2 and output from the output section 22*b* in the second signal line 20*b* as a transmission signal (output signal).

Because the first power supply line 30*a* is connected to the first constant-voltage power supply 31*a*, the second bias-tee circuit 10*b* also includes the first constant-voltage power supply 31*a*.

The second inductor 40*b* is connected to the second signal line 20*b* and the first power supply line 30*a*. Because the first power supply line 30*a* is connected to the first constant-voltage power supply 31*a*, the second inductor 40*b* is electrically connected to the first constant-voltage power supply 31*a* with the first power supply line 30*a* disposed therebetween. Because the second inductor 40*b* is disposed as described above, the power supply voltage of the first constant-voltage power supply 31*a* is applied to the input section 21*b* in the second signal line 20*b*, as illustrated in a path P2. When the input section 21*b* in the second signal line 20*b* is connected to, for example, a driver IC, the power supply voltage of the first constant-voltage power supply 31*a* is applied to the driver IC. Because of the presence of the second inductor 40*b*, a signal transmitted through the second signal line 20*b* is not transmitted to the first power supply line 30*a*.

The second capacitor 50*b* is disposed between the output section 22*b* in the second signal line 20*b* and a connection section between the second signal line 20*b* and the second inductor 40*b*. Because the second capacitor 50*b* is disposed as described above, the power supply voltage of the first constant-voltage power supply 31*a* is not applied to the output section 22*b* in the second signal line 20*b* and is applied to the input section 21*b* in the second signal line 20*b* with stability.

The shortest distance D between the first inductor 40*a* and the second inductor 40*b* is not less than about 0.05 mm and not more than about 1 mm (i.e., from about 0.05 mm to about 1 mm), preferably not less than about 0.05 mm and not more than about 0.4 mm (i.e., from about 0.05 nm to about 0.4 mm). Because the first inductor 40*a* and the second inductor 40*b* are close to each other as described above, the circuit 1 can be miniaturized.

The first inductor 40*a* has a coil axis C1. The second inductor 40*b* has a coil axis C2.

The direction of the coil axis C1 of the first inductor 40*a* and the direction of the coil axis C2 of the second inductor 40*b* are substantially parallel with a mounting surface.

In the present specification, the mounting surface of each component indicates a surface of the component to be mounted on a circuit, more specifically, a surface of the component to be opposed to a circuit substrate. That is, each of the mounting surface of the first inductor 40*a* and the mounting surface of the second inductor 40*b* corresponds to a backside surface opposed to the front surface seen in FIG. 1.

The direction of the coil axis C1 of the first inductor 40*a* and the direction of the coil axis C2 of the second inductor 40*b* form an angle of approximately 90 degrees. Thus, because the first inductor 40*a* and the second inductor 40*b*, which are close to each other as described above, are unlikely to be magnetically coupled, the magnetic fluxes are unlikely to interfere with each other in a high frequency band, and this results in suppressing the degradation in high-frequency characteristics.

In the present specification, the state where the directions of the two coil axes form an angle of approximately 90 degrees indicates the state where the angle between the directions of the two coil axes is not less than about 80 degrees and not more than about 100 degrees (i.e., from about 80 degrees to about 100 degrees), preferably not less than about 85 degrees and not more than about 95 degrees (i.e., from about 85 degrees to about 95 degrees), and more preferably about 90 degrees. That is, the state where the direction of the coil axis C1 of the first inductor 40*a* and the direction of the coil axis C2 of the second inductor 40*b* form an angle of approximately 90 degrees indicates the state where the angle c between the direction of the coil axis C1 of the first inductor 40*a* and the direction of the coil axis C2 of the second inductor 40*b* is not less than about 80 degrees and not more than about 100 degrees (i.e., from about 80 degrees to about 100 degrees), preferably not less than about 85 degrees and not more than about 95 degrees (i.e., from about 85 degrees to about 95 degrees), and more preferably about 90 degrees. As the angle c between the direction of the coil axis C1 of the first inductor 40*a* and the direction of the coil axis C2 of the second inductor 40*b* approaches 90 degrees, the possibility of interference of the magnetic fluxes occurring in the first inductor 40*a* and the second inductor 40*b* is reduced. That is, when the direction of the coil axis C1 of the first inductor 40*a* and the direction of the coil axis C2 of the second inductor 40*b* form an angle of about 90 degrees, that is, they are substantially perpendicular to each other, the magnetic fluxes occurring in the first inductor 40*a* and the second inductor 40*b* are least likely to interfere with each other.

As described above, when a plurality of inductors, here, the first inductor 40*a* and the second inductor 40*b* are close to each other in the circuit 1, the degradation in high-frequency characteristics can be suppressed.

As for the high-frequency characteristics, a transmission coefficient S21 at about 40 GHz may preferably be not less than about −1 dB and not more than about 0 dB, and the transmission coefficient S21 at about 50 GHz may preferably be not less than about −3 dB and not more than about 0 dB (i.e., from about −3 dB to about 0 dB). The transmission coefficient S21 can be determined from the ratio of the electric power of a transmission signal to that of an input signal. More specifically, the transmission coefficient S21 of the circuit 1 can be determined from the ratio of the electric power of a transmission signal output from the output section 22*a* in the first signal line 20*a* to that of an input signal into the input section 21*a* in the first signal line 20*a*. Alternatively, it can be determined from the ratio of the electric power of a transmission signal output from the output section 22*b* in the second signal line 20*b* to that of an input signal input into the input section 21*b* in the second signal line 20*b*. The transmission coefficient S21 with respect to frequencies can be determined by the use of, for example, a network analyzer.

The first bias-tee circuit 10*a* and the second bias-tee circuit 10*b* share the first power supply line 30*a*. That is, the first bias-tee circuit 10*a* and the second bias-tee circuit 10*b* share the first constant-voltage power supply 31*a*. Therefore, the circuit 1 can be simplified.

The first bias-tee circuit 10*a* and the second bias-tee circuit 10*b* may include individual power supply lines. That is, the first bias-tee circuit 10*a* and the second bias-tee circuit 10*b* may include individual constant-voltage power supplies.

The circuit 1 may further include a third bias-tee circuit 10*c* and a fourth bias-tee circuit 10*d*.

The third bias-tee circuit 10*c* includes the first signal line 20*a*, a second power supply line 30*b*, a third inductor 40*c*, and the first capacitor 50*a*.

The second power supply line 30*b* is connected to a second constant-voltage power supply 31*b*. That is, the third bias-tee circuit 10*c* also includes the second constant-voltage power supply 31*b*.

The third inductor 40*c* is connected to the first signal line 20*a* and the second power supply line 30*b*. Because the second power supply line 30*b* is connected to the second constant-voltage power supply 31*b*, the third inductor 40*c* is electrically connected to the second constant-voltage power supply 31*b* with the second power supply line 30*b* disposed therebetween. Because the third inductor 40*c* is disposed as described above, a power supply voltage of the second constant-voltage power supply 31*b* is applied to the output section 22*a* in the first signal line 20*a*, as illustrated in a path P3. When the output section 22*a* in the first signal line 20*a* is connected to, for example, a laser diode, the power supply voltage of the second constant-voltage power supply 31*b* is applied to the laser diode. Because of the presence of the third inductor 40*c*, a signal transmitted through the first signal line 20*a* is not transmitted to the second power supply line 30*b*.

The third inductor 40*c* has a coil axis C3. The direction of the coil axis C3 of the third inductor 40*c* is substantially parallel with the mounting surface.

If another inductor is disposed in a position close to the third inductor 40*c*, more specifically, the shortest distance between the third inductor 40*c* and that inductor is not less than about 0.05 mm and not more than about 1 mm (i.e., from about 0.05 mm to about 1 mm), the direction of the coil axis C3 of the third inductor 40*c* and the direction of the coil axis of that inductor may preferably form an angle of approximately 90 degrees. In that case, the third inductor 40*c* and the inductor close to each other are unlikely to be magnetically coupled to each other, and thus the magnetic fluxes are unlikely to interfere with each other in a high frequency band. Therefore, in addition to the advantage that the magnetic fluxes of the first inductor 40*a* and the second inductor 40*b* are unlikely to interfere with each other, the degradation in high-frequency characteristics can be further suppressed.

For example, when the shortest distance between the third inductor 40*c* and the first inductor 40*a* is not less than about 0.05 mm and not more than about 1 mm (i.e., from about 0.05 mm to about 1 mm), the direction of the coil axis C3 of the third inductor 40*c* and the direction of the coil axis C1 of the first inductor 40*a* may preferably form an angle of approximately 90 degrees.

The first capacitor 50*a* is disposed between the input section 21*a* in the first signal line 20*a* and a connection section between the first signal line 20*a* and the third inductor 40*c*. Because the first capacitor 50*a* is disposed as described above, the power supply voltage of the second constant-voltage power supply 31*b* is not applied to the input section 21*a* in the first signal line 20*a* and is applied to the output section 22*a* in the first signal line 20*a* with stability.

When the first bias-tee circuit 10*a* and the third bias-tee circuit 10*c* are viewed in combination, the first capacitor 50*a* is disposed between the connection section between the first signal line 20*a* and the first inductor 40*a* and the connection section between the first signal line 20*a* and the third inductor 40*c*.

The fourth bias-tee circuit 10*d* includes the second signal line 20*b*, a third power supply line 30*c*, a fourth inductor 40*d*, and the second capacitor 50*b*.

The third power supply line 30*c* is connected to a third constant-voltage power supply 31*c*. That is, the fourth bias-tee circuit 10*d* also includes the third constant-voltage power supply 31*c*.

The fourth inductor 40*d* is connected to the second signal line 20*b* and the third power supply line 30*c*. Because the third power supply line 30*c* is connected to the third constant-voltage power supply 31*c*, the fourth inductor 40*d* is electrically connected to the third constant-voltage power supply 31*c* with the third power supply line 30*c* disposed therebetween. Because the fourth inductor 40*d* is disposed as described above, a power supply voltage of the third constant-voltage power supply 31*c* is applied to the output section 22*b* in the second signal line 20*b*, as illustrated in a path P4. When the output section 22*b* in the second signal line 20*b* is connected to, for example, a laser diode, the power supply voltage of the third constant-voltage power supply 31*c* is applied to the laser diode. Because of the presence of the fourth inductor 40*d*, a signal transmitted through the second signal line 20*b* is not transmitted to the third power supply line 30*c*.

The fourth inductor 40*d* has a coil axis C4. The direction of the coil axis C4 of the fourth inductor 40*d* is substantially parallel with the mounting surface.

If another inductor is disposed in a position close to the fourth inductor 40*d*, more specifically, the shortest distance between the fourth inductor 40*d* and that inductor is not less than about 0.05 mm and not more than about 1 mm (i.e., from about 0.05 mm to about 1 mm), the direction of the coil axis C4 of the fourth inductor 40*d* and the direction of the coil axis of that inductor may preferably form an angle of approximately 90 degrees. In that case, the fourth inductor 40*d* and the inductor close to each other are unlikely to be magnetically coupled to each other, and thus the magnetic fluxes are unlikely to interfere with each other in a high frequency band. Therefore, in addition to the advantage that the magnetic fluxes of the first inductor 40*a* and the second inductor 40*b* are unlikely to interfere with each other, the degradation in high-frequency characteristics can be further suppressed.

For example, when the shortest distance between the fourth inductor 40*d* and the second inductor 40*b* is not less than about 0.05 mm and not more than about 1 mm (i.e., from about 0.05 mm to about 1 mm), the direction of the coil axis C4 of the fourth inductor 40*d* and the direction of the coil axis C2 of the second inductor 40*b* may preferably form an angle of approximately 90 degrees.

The second capacitor 50*b* is disposed between the input section 21*b* in the second signal line 20*b* and a connection section between the second signal line 20*b* and the fourth inductor 40*d*. Because the second capacitor 50*b* is disposed as described above, the power supply voltage of the third constant-voltage power supply 31*c* is not applied to the input section 21*b* in the second signal line 20*b* and is applied to the output section 22*b* in the second signal line 20*b* with stability.

When the second bias-tee circuit 10*b* and the fourth bias-tee circuit 10*d* are viewed in combination, the second capacitor 50*b* is disposed between the connection section between the second signal line 20*b* and the second inductor 40*b* and the connection section between the second signal line 20*b* and the fourth inductor 40*d*.

Publicly known signal lines can be used as the first signal line 20*a* and the second signal line 20*b*.

Publicly known power supply lines can be used as the first power supply line 30*a*, the second power supply line 30*b*, and the third power supply line 30*c*.

Publicly known constant-voltage power supplies can be used as the first constant-voltage power supply 31*a*, the second constant-voltage power supply 31*b*, and the third constant-voltage power supply 31*c*.

The first constant-voltage power supply 31*a*, the second constant-voltage power supply 31*b*, and the third constant-voltage power supply 31*c* may have the same power supply voltage or mutually different power supply voltages. Among the first constant-voltage power supply 31*a*, the second constant-voltage power supply 31*b*, and the third constant-voltage power supply 31*c*, two of them may have the same power supply voltage, and the remaining one may have a different power supply voltage.

Publicly known capacitors can be used as the first capacitor 50*a* and the second capacitor 50*b*.

Publicly known inductors can be used as the first inductor 40*a*, the second inductor 40*b*, the third inductor 40*c*, and the fourth inductor 40*d*. In particular, an inductor including a multilayer body in which a plurality of insulating layers made of a ferrite material are laminated, a coil disposed inside the multilayer body, and an outer electrode disposed on a surface of the multilayer body and electrically connected to the coil may preferably be used. One example of such an inductor is described below. In the following description, the first inductor, the second inductor, the third inductor, and the fourth inductor are simply referred to as the inductor unless it is necessary to distinguish them.

Figure 2:
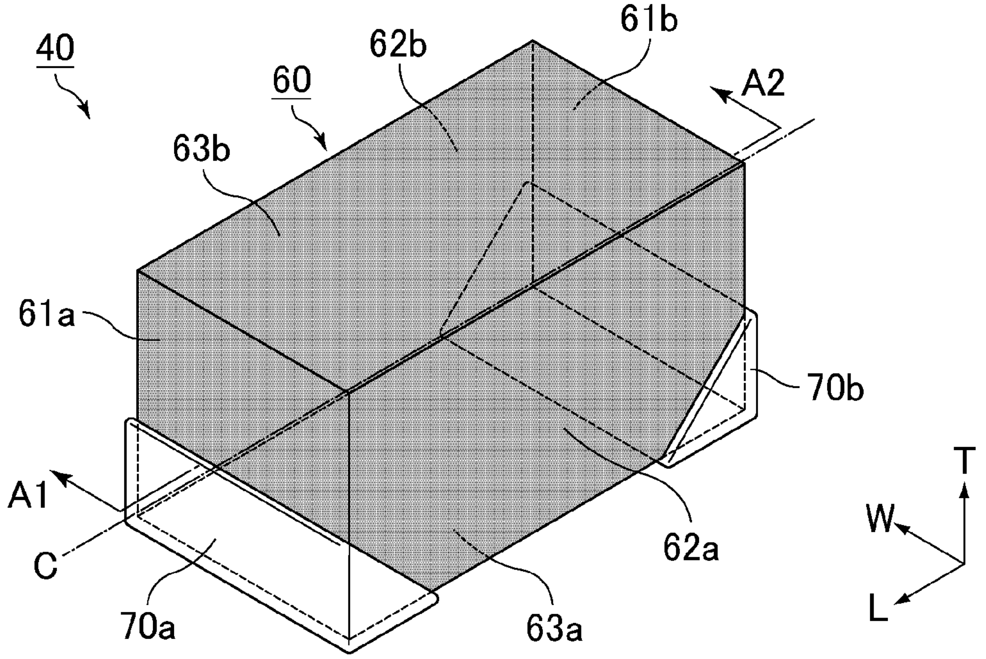
FIG. 2 is a perspective diagram that schematically illustrates an example inductor used in the circuit according to the present disclosure.

FIG. 2 is a perspective diagram that schematically illustrates an example inductor used in the circuit according to the present disclosure.

As illustrated in FIG. 2, an inductor 40 includes a multilayer body 60, a first outer electrode 70*a*, and a second outer electrode 70*b*. Although not illustrated in FIG. 2, the inductor 40 also includes a coil disposed inside the multilayer body 60, as described below.

Figure 3:
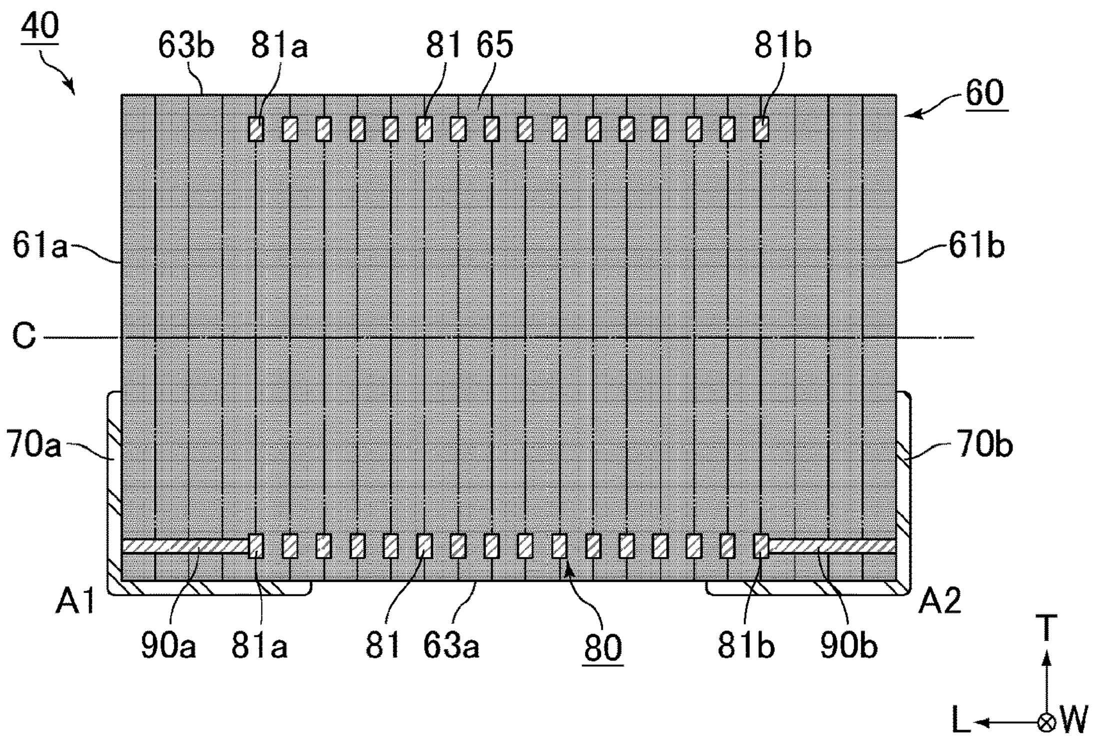
FIG. 3 is a cross-sectional diagram that illustrates a section corresponding to a line segment A1-A2 in FIG. 2.

In the present specification, the longitudinal direction, the width direction, and the height direction are directions defined as L, W, and T, respectively, as illustrated in FIGS. 2 and 3. Here, the longitudinal direction L, the width direction W, and the height direction T are substantially perpendicular to each other.

The multilayer body 60 is an approximately rectangular parallelepiped having six faces. The multilayer body 60 has a first end surface 61*a* and a second end surface 61*b* which are opposed to each other in the longitudinal direction L, a first side surface 62*a* and a second side surface 62*b* which are opposed to each other in the width direction W, and a first principal surface 63*a* and a second principal surface 63*b* which are opposed to each other in the height direction T.

When the inductor 40 is mounted in a circuit, the first principal surface 63*a* of the multilayer body 60 is the mounting surface.

The corner sections and the ridge sections of the multilayer body 60 may preferably be rounded. The corner sections of the multilayer body 60 are the sections where three surfaces of the multilayer body 60 intersect. The ridge sections of the multilayer body 60 are the sections where two surfaces of the multilayer body 60 intersect.

The first outer electrode 70*a* is disposed on the surface of the multilayer body 60. More specifically, the first outer electrode 70*a* extends on from a portion of the first end surface 61*a* to a portion of the first side surface 62*a*, a portion of the second side surface 62*b*, and a portion of the first principal surface 63*a* of the multilayer body 60.

The position of the first outer electrode 70*a* is not limited to the position illustrated in FIG. 2. For example, the first outer electrode 70*a* may be disposed on only a portion of the first end surface 61*a* of the multilayer body 60. The first outer electrode 70*a* may extend on from a portion of the first end surface 61*a* of the multilayer body 60 to only a portion of the first principal surface 63*a* of the multilayer body 60. When the first outer electrode 70*a* is disposed on the portion of the first principal surface 63*a*, which is the mounting surface of the multilayer body 60, the mountability of the inductor 40 is improved.

The second outer electrode 70*b* is disposed on the surface of the multilayer body 60. More specifically, the second outer electrode 70*b* extends on from a portion of the second end surface 61*b* to a portion of the first side surface 62*a*, a portion of the second side surface 62*b*, and a portion of the first principal surface 63*a* of the multilayer body 60.

The position of the second outer electrode 70*b* is not limited to the position illustrated in FIG. 2. For example, the second outer electrode 70*b* may be disposed on only a portion of the second end surface 61*b* of the multilayer body 60. The second outer electrode 70*b* may extend on from a portion of the second end surface 61*b* of the multilayer body 60 to only a portion of the first principal surface 63*a* of the multilayer body 60. When the second outer electrode 70*b* is disposed on the portion of the first principal surface 63*a*, which is the mounting surface of the multilayer body 60, the mountability of the inductor 40 is improved.

Each of the first outer electrode 70*a* and the second outer electrode 70*b* may have a single-layer structure or a multilayer structure.

When each of the first outer electrode 70*a* and the second outer electrode 70*b* has the single-layer structure, examples of an element of each of the outer electrodes may include silver, gold, copper, palladium, nickel, aluminum, and an alloy containing at least one of those metals.

When each of the first outer electrode 70*a* and the second outer electrode 70*b* is the multilayer structure, each outer electrode may include, for example, an underlying electrode layer containing silver, a nickel plating film, and a tin plating film which are positioned in sequence from the surface side of the multilayer body 60.

FIG. 3 is a cross-sectional diagram that schematically illustrates a section corresponding to a line segment A1-A2 in FIG. 2.

As illustrated in FIG. 3, the multilayer body 60 is the one in which a plurality of insulating layers 65 are laminated in the longitudinal direction L. The boundaries of the insulating layers 65 illustrated in FIG. 3 for the sake of convenience of explanation may not be clear in actuality.

The insulating layers 65 are made of a ferrite material. Therefore, magnetic fluxes are unlikely to leak to the outside of the multilayer body 60.

In known circuits, when inductors including insulating layers are disposed in close positions in the circuits, even if they are made of the ferrite material, those close inductors are likely to be magnetically coupled to each other, the magnetic fluxes may interfere with each other in a high frequency band, and thus the high-frequency characteristics may degrade. In contrast, in the case of the circuit 1, in which the first inductor 40*a* and the second inductor 40*b* are close, because the directions of the coil axes of both inductors form an angle of approximately 90 degrees, the first inductor 40*a* and the second inductor 40*b* are unlikely to be magnetically coupled to each other, and the magnetic fluxes are unlikely to interfere with each other in a high frequency band. Thus, the degradation in high-frequency characteristics is suppressed. When the insulating layers in the first inductor 40*a* and the second inductor 40*b* are made of the ferrite material, because the magnetic fluxes are unlikely to leak to the outside of the first inductor 40*a* and the second inductor 40*b*, the degradation in high-frequency characteristics is further suppressed.

Examples of the ferrite material may include the materials produced by a method described below.

First, iron oxide ($Fe_2O_3$), zinc oxide (ZnO), copper oxide (CuO), and nickel oxide (NiO), which are oxide materials, in a predetermined ratio are weighed. Each of the oxide materials may contain incidental impurities. Next, those oxide materials are mixed by a wet process, and the mixture is ground. At that time, an additive, such as manganese oxide ($Mn_3O_4$), cobalt oxide ($Co_3O_4$), tin oxide ($SnO_2$), bismuth oxide ($Bi_2O_3$), or silicon oxide ($SiO_2$), may be added. The ground product is dried and then calcined. Example temperatures in the calcination may be not less than about 700° C. and not more than about 800° C. (i.e., from about 700° C. to about 800° C.). By the above-described way, the powder ferrite material is obtained.

In terms of increasing the inductance of the inductor 40, the composition of the ferrite material may preferably be iron oxide ($Fe_2O_3$) of not less than about 40 mol % and not more than about 49.5 mol % (i.e., from about 40 mol % to about 49.5 mol %), zinc oxide (ZnO) of not less than about 5 mol % and not more than about 35 mol % (i.e., from about 5 mol % to about 35 mol %), copper oxide (CuO) of not less than about 6 mol % and not more than about 12 mol % (i.e., from about 6 mol % to about 12 mol %), and nickel oxide (NiO) of not less than about 8 mol % and not more than about 40 mol % (i.e., from about 8 mol % to about 40 mol %).

A coil 80 is disposed inside the multilayer body 60. The coil 80 is the one in which a plurality of coil conductors 81 are laminated in the longitudinal direction L with the insulating layers 65 and are electrically connected together and may be, for example, a solenoid. Because the inductor 40 includes the coil 80 having that shape, it can also be called a multilayer coil component. In FIG. 3, the shape of the coil 80, the positions of the coil conductors 81, the connection of the coil conductors 81, and the like are not precisely illustrated. For example, the coil conductors 81 adjacent in the longitudinal direction L are electrically connected to each other with a via conductor disposed therebetween not illustrated.

The inductor 40, more specifically, the coil 80 has a coil axis C. The coil axis C of the inductor 40 extends along the longitudinal direction L through the multilayer body 60 between the first end surface 61*a* and the second end surface 61*b*. That is, the direction of the coil axis C of the inductor 40 is substantially parallel with the first principal surface 63*a*, which is the mounting surface of the multilayer body 60.

The coil axis C of the inductor 40 extends through the barycenter of the shape of the coil 80 as seen from the longitudinal direction L. As seen from the longitudinal direction L, the coil 80 may be substantially circular or substantially polygonal.

The first outer electrode 70*a* is electrically connected to the coil 80 with a first coupling conductor 90*a* disposed therebetween. Here, among the plurality of coil conductors 81, a coil conductor 81*a* is in the position nearest the first end surface 61*a* of the multilayer body 60. Accordingly, the first outer electrode 70*a* is electrically connected to the coil conductor 81*a* with the first coupling conductor 90*a* disposed therebetween.

The first coupling conductor 90*a* is the one in which via conductors not illustrated are laminated in the longitudinal direction L with the insulating layers 65 and electrically connected together. The first coupling conductor 90*a* is exposed through the first end surface 61*a* of the multilayer body 60.

The first coupling conductor 90*a* may preferably linearly connect the first outer electrode 70*a* and the coil 80, here, the first outer electrode 70*a* and the coil conductor 81*a*. As seen from the longitudinal direction L, the first coupling conductor 90*a* may preferably overlap the coil conductor 81*a* and be in a position nearer the first principal surface 63*a*, which is the mounting surface of the multilayer body 60, than the coil axis C. In such cases, the electrical connection of the first outer electrode 70*a* and the coil 80 can be facilitated.

The state where the first coupling conductor 90*a* linearly connects the first outer electrode 70*a* and the coil 80 indicates the state where as seen from the longitudinal direction L, the via conductors forming the first coupling conductor 90*a* overlap each other. The via conductors forming the first coupling conductor 90*a* may not be linearly aligned in the strict sense.

The first coupling conductor 90*a* may preferably be connected in a section nearest the first principal surface 63*a* of the multilayer body 60 in the coil conductor 81*a*. In that case, the area of the section on the first end surface 61*a* of the multilayer body 60 in the first outer electrode 70*a* can be reduced. Consequently, the stray capacitance between the first outer electrode 70*a* and the coil 80 can be reduced, and the high-frequency characteristics of the inductor 40 can be improved.

The number of first coupling conductors 90*a* may be one or more.

The second outer electrode 70*b* is electrically connected to the coil 80 with a second coupling conductor 90*b* disposed therebetween. Here, among the plurality of coil conductors 81, a coil conductor 81*b* is in the position nearest the second end surface 61*b* of the multilayer body 60. Accordingly, the second outer electrode 70*b* is electrically connected to the coil conductor 81*b* with the second coupling conductor 90*b* disposed therebetween.

The second coupling conductor 90*b* is the one in which via conductors not illustrated are laminated in the longitudinal direction L with the insulating layers 65 and electrically connected together. The second coupling conductor 90*b* is exposed through the second end surface 61*b* of the multilayer body 60.

The second coupling conductor 90*b* may preferably linearly connect the second outer electrode 70*b* and the coil 80, here, the second outer electrode 70*b* and the coil conductor 81*b*. As seen from the longitudinal direction L, the second coupling conductor 90*b* may preferably overlap the coil conductor 81*b* and be in a position nearer the first principal surface 63*a*, which is the mounting surface of the multilayer body 60, than the coil axis C. In such cases, the electrical connection of the second outer electrode 70*b* and the coil 80 can be facilitated.

The state where the second coupling conductor 90*b* linearly connects the second outer electrode 70*b* and the coil 80 indicates the state where as seen from the longitudinal direction L, the via conductors forming the second coupling conductor 90*b* overlap each other. The via conductors forming the second coupling conductor 90*b* may not be linearly aligned in the strict sense.

The second coupling conductor 90*b* may preferably be connected in a section nearest the first principal surface 63*a* of the multilayer body 60 in the coil conductor 81*b*. In that case, the area of the section on the second end surface 61*b* of the multilayer body 60 in the second outer electrode 70*b* can be reduced. Consequently, the stray capacitance between the second outer electrode 70*b* and the coil 80 can be reduced, and the high-frequency characteristics of the inductor 40 can be improved.

The number of second coupling conductors 90*b* may be one or more.

The inductor 40 may be manufactured by, for example, a method described below.

First, a ferrite material, an organic binder, such as a polyvinyl butyral-based resin, an organic solvent, such as ethanol or toluene, or other substance are mixed, then ground, and ceramic slurry is produced. The ceramic slurry is shaped into a sheet by a doctor blade method or the like, the sheet is punched into a predetermined size, and ceramic green sheets are produced.

Next, via holes are formed by emitting laser light to predetermined locations of the ceramic green sheets. Then, conductive paste, such as silver paste, is charged in to the via holes and is applied on principal surfaces of the ceramic green sheets by screen-printing or the like. In that way, conductive patterns for via conductors are formed in the via holes, and conductive patterns for coil conductors connected to the conductive patterns for via conductors are formed on the principal surfaces of the ceramic green sheets. After that, they are dried, and coil sheets being the ceramic green sheets with the conductive patterns for coil conductors and the conductive patterns for via conductors are obtained.

Aside from the coil sheets, via sheets being the ceramic green sheets with the conductive patterns for via conductors are produced.

Next, after the coil sheets and the via sheets are laminated in predetermined order, the lamination is subjected to thermocompression bonding, and a multilayer body block is produced.

Next, the multilayer body block is cut into individual chips of a predetermined size. The individual chips may have corner sections and ridge sections rounded by, for example, barrel polishing. After that, the individual chips are fired. At that time, the ceramic green sheets of the coil sheets and via sheets become the insulating layers 65 after the firing, and they constitute the multilayer body 60. The conductive patterns for coil conductors and the conductive patterns for via conductors on the coil sheets become the coil conductors 81 and the via conductors, respectively, after the firing, and they constitute the coil 80. In that way, the multilayer body 60 in which the plurality of insulating layers 65 made of the ferrite material are laminated and the coil 80 disposed inside the multilayer body 60 are produced. The conductive patterns for via conductors on the via sheets become the via conductors after the firing, and they constitute the first coupling conductor 90*a* and the second coupling conductor 90*b*.

Next, the multilayer body 60 is obliquely immersed in a layer in which conductive paste, such as silver paste, is spread to a predetermined thickness. By baking the obtained film, an underlying electrode layer is formed on the surface of the multilayer body 60. More specifically, an underlying electrode layer extending on from a portion of the first end surface 61*a* to a portion of the first side surface 62*a*, a portion of the second side surface 62*b*, and a portion of the first principal surface 63*a* of the multilayer body 60 is formed. In addition, an underlying electrode layer extending on from a portion of the second end surface 61*b* to a portion of the first side surface 62*a*, a portion of the second side surface 62*b*, and a portion of the first principal surface 63*a* of the multilayer body 60 is formed. After that, a nickel plating film and a tin plating film are formed in sequence on each of the underlying electrode layers by electrolyte plating or the like. In that way, the first outer electrode 70*a* and the second outer electrode 70*b* are formed.

The inductor 40 is manufactured by the above-described way.

EXAMPLES

Examples in which the circuit according to the present disclosure is more specifically disclosed are described below. The present disclosure is not limited to those examples.

Example 1

The circuit 1 illustrated in FIG. 1 was used as a circuit in Example 1. The inductor 40 illustrated in FIGS. 2 and 3 was used as each of the first inductor 40*a*, the second inductor 40*b*, the third inductor 40*c*, and the fourth inductor 40*d*. The shortest distance D between the first inductor 40*a* and the second inductor 40*b* was 0.05 mm. The direction of the coil axis C1 of the first inductor 40*a* and the direction of the coil axis C2 of the second inductor 40*b* formed an angle of 90 degrees.

Example 2

The circuit in Example 2 was the same as the circuit in Example 1 except that the shortest distance D between the first inductor 40*a* and the second inductor 40*b* was 0.1 mm.

Example 3

The circuit in Example 3 was the same as the circuit in Example 1 except that the shortest distance D between the first inductor 40*a* and the second inductor 40*b* was 0.2 mm.

Example 4

The circuit in Example 4 was the same as the circuit in Example 1 except that the shortest distance D between the first inductor 40*a* and the second inductor 40*b* was 0.3 mm.

Example 5

The circuit in Example 5 was the same as the circuit in Example 1 except that the shortest distance D between the first inductor 40*a* and the second inductor 40*b* was 0.4 mm.

Example 6

The circuit in Example 6 was the same as the circuit in Example 1 except that the shortest distance D between the first inductor 40*a* and the second inductor 40*b* was 1 mm.

Comparative Example 1

Figure 4:
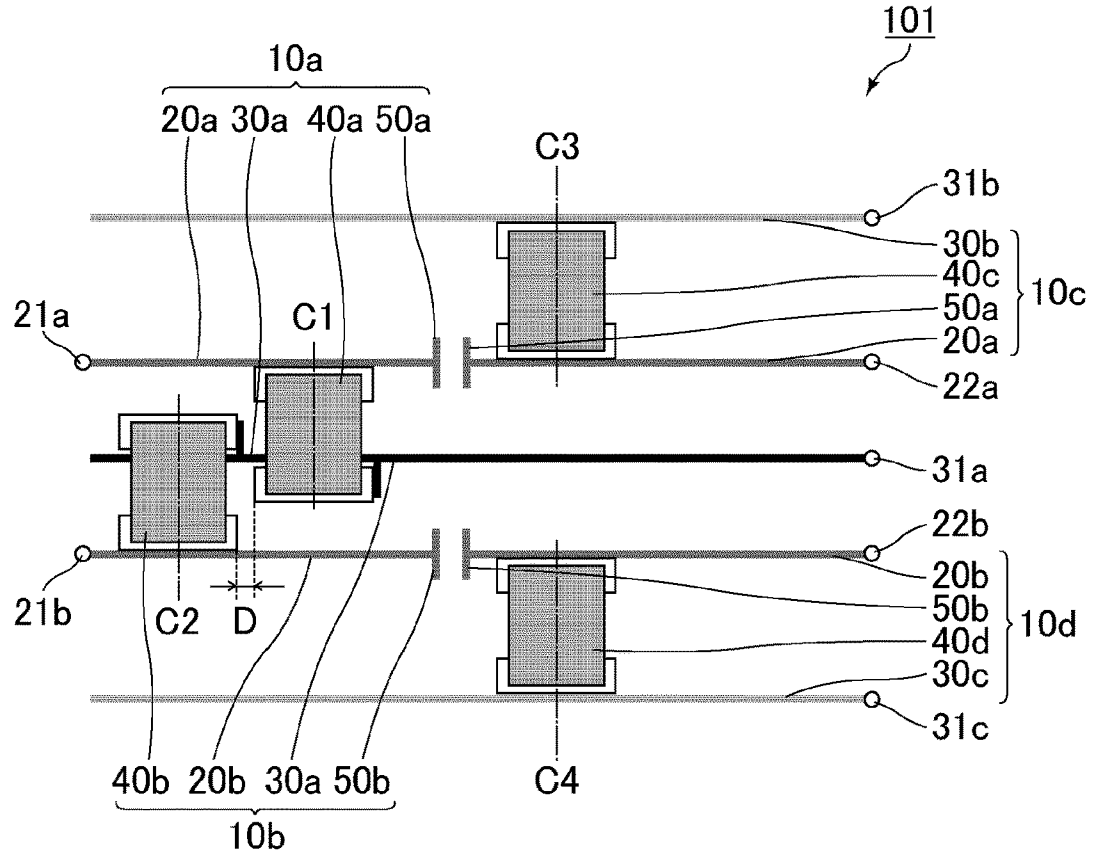
FIG. 4 is a plan diagram that schematically illustrates a circuit according to Comparative Example 1.

FIG. 4 is a plan diagram that illustrates a circuit according to Comparative Example 1. As illustrated in FIG. 4, a circuit 101 in Comparative Example 1 was the same as the circuit in Example 1 except that the direction of the coil axis C1 of the first inductor 40*a* and the direction of the coil axis C2 of the second inductor 40*b* was parallel with each other.

Comparative Example 2

The circuit in Comparative Example 2 was the same as the circuit in Comparative Example 1 except that the shortest distance D between the first inductor 40*a* and the second inductor 40*b* was 0.1 mm.

Comparative Example 3

The circuit in Comparative Example 3 was the same as the circuit in Comparative Example 1 except that the shortest distance D between the first inductor 40*a* and the second inductor 40*b* was 0.2 mm.

Comparative Example 4

The circuit in Comparative Example 4 was the same as the circuit in Comparative Example 1 except that the shortest distance D between the first inductor 40*a* and the second inductor 40*b* was 0.3 mm.

Comparative Example 5

The circuit in Comparative Example 5 was the same as the circuit in Comparative Example 1 except that the shortest distance D between the first inductor 40*a* and the second inductor 40*b* was 0.4 mm.

Comparative Example 6

The circuit in Comparative Example 6 was the same as the circuit in Comparative Example 1 except that the shortest distance D between the first inductor 40*a* and the second inductor 40*b* was 1 mm.

[Evaluation]

The transmission coefficient S21 with respect to frequencies was determined for the circuits in Examples 1 to 6 and the circuits in Comparative Examples 1 to 6 by simulation. In that simulation, the power supply voltage of the first constant-voltage power supply 31*a* was set at 3.3 V, the power supply voltage of the second constant-voltage power supply 31*b* was set at −2.0 V, and the power supply voltage of the third constant-voltage power supply 31*c* was set at −2.0 V.

Figure 5:
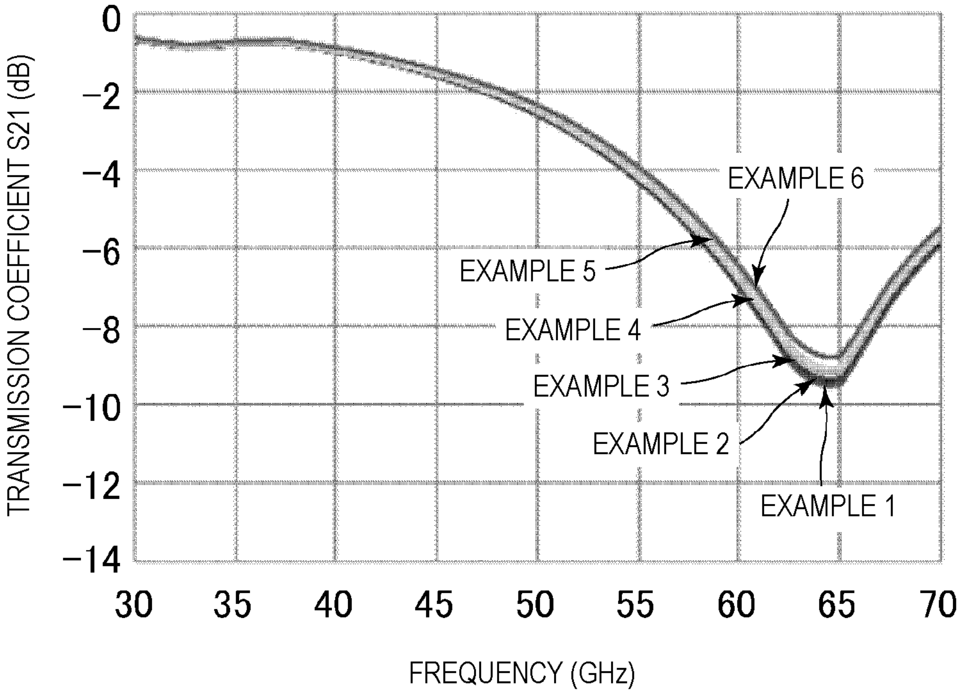
FIG. 5 is a graph that illustrates results of simulation of a transmission coefficient with respect to frequencies for Embodiments 1 to 6.

FIG. 5 is a graph of results of the simulation of the transmission coefficient S21 with respect to frequencies for the circuits in Examples 1 to 6. For the circuits in Examples 1 to 6, although the first inductor 40*a* and the second inductor 40*b* were close to each other, more specifically, the shortest distance D between the first inductor 40*a* and the second inductor 40*b* was not less than 0.05 mm and not more than 1 mm (i.e., from 0.05 mm to 1 mm), the transmission coefficient S21 was a satisfactory value, as illustrated in FIG. 5. In the circuits in Examples 1 to 6, even if the shortest distance D between the first inductor 40*a* and the second inductor 40*b* became smaller, the transmission coefficient S21 did not virtually decrease, and the degradation in high-frequency characteristics was also suppressed.

Figure 6:
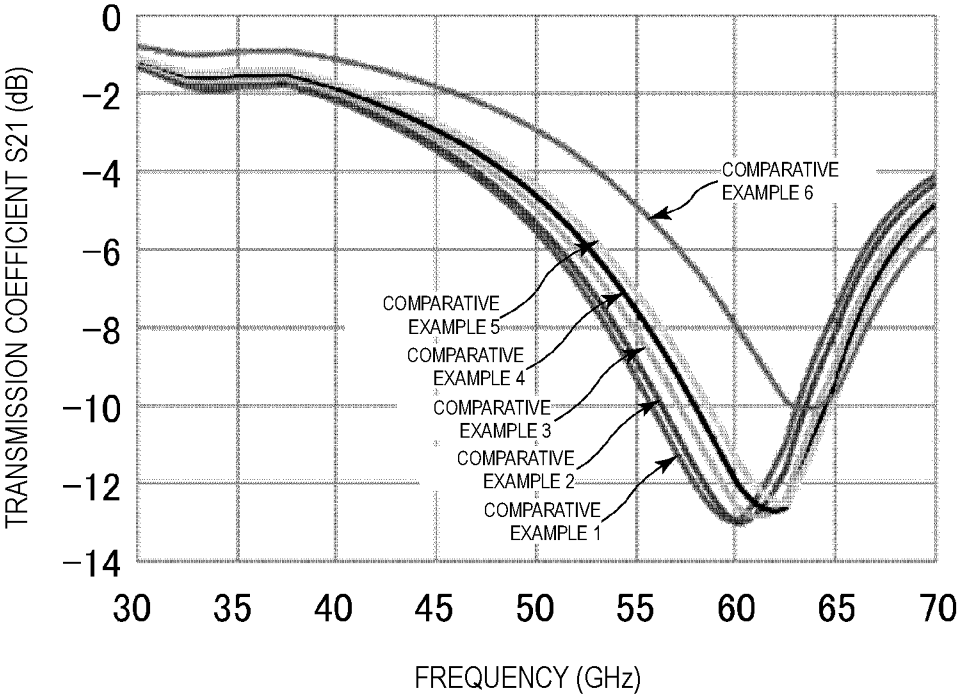
FIG. 6 is a graph that illustrates results of simulation of a transmission coefficient with respect to frequencies for Comparative Examples 1 to 6.

FIG. 6 is a graph of results of the simulation of the transmission coefficient S21 with respect to frequencies for the circuits in Comparative Examples 1 to 6. For the circuits in Comparative Examples 1 to 6, similar with the circuits in Examples 1 to 6, although the shortest distance D between the first inductor 40*a* and the second inductor 40*b* was also not less than 0.05 mm and not more than 1 mm (i.e., from 0.05 mm to 1 mm), as the shortest distance D between the first inductor 40*a* and the second inductor 40*b* became smaller, the transmission coefficient S21 significantly decreased, as illustrated in FIG. 6.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A circuit comprising:

a bias-tee circuit including a signal line including a first signal line and a second signal line, a constant-voltage power supply including a first constant-voltage power supply, a second constant-voltage power supply, and a third constant-voltage power supply, an inductor including a first inductor, a second inductor, a third inductor and a fourth inductor, and a capacitor including a first capacitor and a second capacitor, the first capacitor is disposed between an output section in the first signal line and a connection section between the first signal line and the first inductor, and the second capacitor is disposed between an output section in the second signal line and a connection section between the second signal line and the second inductor, a shortest distance between the first inductor and the second inductor being from 0.05 mm to 1 mm, and a direction of a coil axis of the first inductor and a direction of a coil axis of the second inductor being parallel with a mounting surface and forming an angle of approximately 90 degrees, wherein the first inductor is connected to the first signal line and the constant-voltage power supply, the second inductor is connected to the second signal line and the constant-voltage power supply, the first inductor is connected to the first signal line and the first constant-voltage power supply, the second inductor is connected to the second signal line and the first constant-voltage power supply, the third inductor is connected to the first signal line and the second constant-voltage power supply, the fourth inductor is connected to the second signal line and the third constant-voltage power supply, the first capacitor is disposed between an input section in the first signal line and a connection section between the first signal line and the third inductor, and the second capacitor is disposed between an input section in the second signal line and a connection section between the second signal line and the fourth inductor.

2. The circuit according to claim 1, wherein the inductor includes a multilayer body in which a plurality of insulating layers made of a ferrite material are laminated, a coil disposed inside the multilayer body, and an outer electrode disposed on a surface of the multilayer body and electrically connected to the coil.

3. The circuit according to claim 2, wherein the inductor includes a coupling conductor electrically connecting the coil to the outer electrode.

* * * * *